US012194563B2

(12) United States Patent
Luedi

(10) Patent No.: US 12,194,563 B2
(45) Date of Patent: Jan. 14, 2025

(54) MACHINING APPARATUS FOR LASER MACHINING A WORKPIECE AND METHOD FOR LASER MACHINING A WORKPIECE

(71) Applicant: Bystronic Laser AG, Niederoenz (CH)

(72) Inventor: Andreas Luedi, Burgdorf (CH)

(73) Assignee: BYSTRONIC LASER AG, Niederönz (CH)

( * ) Notice: Subject to any disclaimer, the term of this patent is extended or adjusted under 35 U.S.C. 154(b) by 24 days.

(21) Appl. No.: 17/288,553

(22) PCT Filed: Oct. 25, 2019

(86) PCT No.: PCT/EP2019/079185
§ 371 (c)(1),
(2) Date: Apr. 25, 2021

(87) PCT Pub. No.: WO2020/084114
PCT Pub. Date: Apr. 30, 2020

(65) Prior Publication Data
US 2021/0354235 A1 Nov. 18, 2021

(30) Foreign Application Priority Data

Oct. 26, 2018 (DE) .................... 10 2018 126 846 .7

(51) Int. Cl.
*B23K 26/03* (2006.01)
*B23K 26/06* (2014.01)
(Continued)

(52) U.S. Cl.
CPC ........ *B23K 26/032* (2013.01); *B23K 26/0643* (2013.01); *B23K 26/38* (2013.01); *G02B 6/02* (2013.01); *G02B 6/262* (2013.01)

(58) Field of Classification Search
CPC .. B23K 26/032; B23K 26/0643; B23K 26/38; G05B 6/02; G02B 6/262
See application file for complete search history.

(56) References Cited

U.S. PATENT DOCUMENTS

| 2008/0170243 A1* | 7/2008 | Nomaru | B23K 26/048 356/634 |
| 2013/0068738 A1* | 3/2013 | Schurmann | B23K 26/03 219/121.72 |

(Continued)

FOREIGN PATENT DOCUMENTS

| DE | 10 2012 001609 B3 | 2/2013 | |
| DE | 102014214427 A1 * | 1/2016 | ............... A62D 3/17 |

OTHER PUBLICATIONS

Machine Translation of German Patent Application DE 10 2012 001609 B3 into English.
(Continued)

*Primary Examiner* — Brian W Jennison
(74) *Attorney, Agent, or Firm* — BelayIP

(57) ABSTRACT

The present disclosure relates to a machining apparatus for laser machining a workpiece, such as laser cutting. The apparatus includes a machining laser source for generating a machining laser beam; an illumination laser source having a power for generating an illumination laser beam having a spectral range; an outlet opening for the machining laser beam and the illumination laser beam; and a laser beam guiding device which is designed such that the machining laser beam and the illumination laser beam emerge coaxially through the outlet opening; wherein at least one element selected from the power of the illumination laser source and the spectral range of the illumination laser beam is selected such that the illumination by the illumination laser beam is brighter than a self-emission of the workpiece in a machining region during laser machining. Additionally, a method for laser machining a workpiece is also included in the present disclosure.

7 Claims, 5 Drawing Sheets

(51) Int. Cl.
*B23K 26/38* (2014.01)
*G02B 6/02* (2006.01)
*G02B 6/26* (2006.01)

(56) References Cited

U.S. PATENT DOCUMENTS

| | | | |
|---|---|---|---|
| 2013/0294728 A1* | 11/2013 | Rockwell | B23K 26/0604 |
| | | | 385/39 |
| 2014/0177038 A1 | 6/2014 | Rrataj et al. | |
| 2016/0193692 A1 | 7/2016 | Regaard et al. | |
| 2017/0043431 A1* | 2/2017 | Kuba | B23K 26/032 |

OTHER PUBLICATIONS

International Preliminary Report on Patentability for OEE priority document prosecution PCT/EP2019/079185.

* cited by examiner

MACHINING APPARATUS FOR LASER MACHINING A WORKPIECE AND METHOD FOR LASER MACHINING A WORKPIECE

CROSS REFERENCE TO RELATED APPLICATIONS

This application is a national phase application of International Application PCT/EP2019/079185, filed on Oct. 25, 2019, and further claims priority to German Patent Application DE 10 2018 126 846.7, filed on Oct. 26, 2018, both of which were hereby incorporated herein by reference.

BACKGROUND OF THE INVENTION

The present invention relates to a machining apparatus for laser machining a workpiece, use of a machining apparatus for laser machining a workpiece and a method for laser machining a workpiece.

Flatbed cutting systems are typically operated with fibre lasers which have a power above 1 kW as a machining laser. Laser machining systems, such as flat board cutting equipment, often includes an auxiliary laser which, for example, indicates to the operator of the equipment the position or beam axis of the machining laser as described, for example, in US2018104769A or US2018104838A. The auxiliary laser can be guided coaxially with the machining laser, as known, for example, from JP11344417A and JP2000135583A. These auxiliary lasers typically have a low power of less than 5 mW.

Flatbed cutting systems usually have no or only simple process monitoring. In the case of the latter, a photodiode is usually used, which detects the process luminescence, also referred to as process light, which arises during thermal machining of the workpiece. Occasionally, multiple diodes are used. With photodiodes, however, no local resolution of the process light is displayed.

In laser welding, camera-based process monitoring has been established for some time. In addition, active process monitoring with a camera has also proven itself here. Not only is the process luminescence passively observed, but the process zone is illuminated with artificial illumination, wherein the (typically coaxial) camera is primarily intended to see the light of this illumination reflected on the workpiece.

The benefits of camera observation with illumination (versus no illumination) are primarily that the process's own thermal illumination can be suppressed so that the process zone (kerf geometry, etc.) can be better observed.

So that the thermal process luminescence, here referred to as self-emission or thermal self-emission, can be suppressed, a narrow-band illumination and a corresponding narrow-band detection, which is outside the spectrum of the machining laser, is needed. Commercially available and cost-effective cameras are in the visible to near-infrared electromagnetic spectral region, which means that illumination also has to be selected in this region. However, the thermal self-emission, in particular of laser-machined metals, is typically in the visible to near-infrared spectral region. In other words, in particular in the laser machining of metals, the illumination, the detection and the thermal self-emission take place substantially in the same spectral range so that suppression of the thermal self-illumination for the purpose of process observation is difficult.

Illumination sources available for narrow-band illumination include, for example, LEDs or diode lasers. In order to be able to attach the known available illumination sources to a machining head of a laser machining system, for example, the illumination sources are usually designed especially for this purpose. The disadvantage here is that there is usually little available space on the machining head and the machining head should have the lowest possible weight. In addition, an illumination-specific ideal placement for the illumination source so that the process zone can be illuminated well is often difficult to find on the machining head.

US 2017/0043431 A1 discloses a laser processing head apparatus with a camera monitor including a light source for illumination. An optical filter blocks transmission of the processing point-emitted light and the processing point-reflected laser beam, and transmits the illumination light for imaging. DE 10 2012 001 609 B3 relates to a laser processing head for processing a workpiece by means of a working laser beam, with a beam shaping optics for collimating a working laser beam emerging from a fibre end of an optical fibre, a focusing optics for focusing the working laser beam onto the workpiece, and a camera with an adjustable imaging optics. US 2016/0193692 A1 relates to devices and methods for monitoring a cutting process on a workpiece. A focusing element focusses a high-energy beam onto the workpiece. An image capture apparatus captures a region at the workpiece to be monitored. An evaluation apparatus determines at least one characteristic variable of the cutting process.

BRIEF SUMMARY OF THE INVENTION

The aim of the invention is to provide a machining apparatus for laser machining a workpiece with illumination and a method for laser machining of a workpiece with illumination.

This aim is achieved by a machining apparatus for laser machining a workpiece, use of a machining apparatus and a method for laser machining a workpiece.

In one embodiment of the invention, a machining apparatus is provided for laser machining a workpiece, in particular for laser cutting, comprising a machining laser source configured to generate a machining laser beam; an illumination laser source having a power for generating an illumination laser beam having a spectral range; an outlet opening for the machining laser beam and the illumination laser beam; and a laser beam guiding device which is configured to guide the machining laser beam and the illumination laser beam coaxially through the outlet opening; wherein the power of the illumination laser source and the spectral range of the illumination laser beam are chosen to generate an illumination by the illumination laser beam which is brighter than a self-emission of the workpiece in a machining region during laser machining; wherein the power of the illumination laser source is at least 50 mW and the central wavelength of the spectral range of the illumination laser beam is in the range 300 to 1000 nm, and the spectral range of the illumination laser beam is a wavelength band having a width of less than 20 nm; wherein at least one element selected from the laser beam guiding device, the optical unit, the machining laser source and the illumination laser source is configured to generate a focus of the illumination laser beam and a focus of the machining laser beam which are axially apart from one another; wherein the machining laser source and the illumination laser source are configured to generate different spectral ranges of the laser beams generated thereby; and wherein the optical unit is dispersive; and wherein the spectral range of the machining laser beam includes a first wavelength and the spectral range of the illumination laser beam includes a second wavelength less than the first wavelength; wherein the laser beam guiding device comprises at least one transport fibre which is configured to guide the machining laser beam and the illumination laser beam coaxially; wherein the transport fibre has an inner fibre core; and wherein the machining laser source and the illumination laser source are coupled to the transport fibre to guide the machining laser beam through the inner fibre core; wherein the transport fibre has an outer fibre core enclosing the inner fibre core and/or a fibre cladding enclosing the inner or outer fibre core; and wherein the machining laser source and the illumination laser source are coupled to the transport fibre to guide the illumination laser beam at least partially through the outer fibre core and/or through the fibre cladding.

An advantage of this embodiment is that, owing to the coaxial machining laser and illumination laser beams, the illumination site ideally coincides with the machining site. In addition, since the illumination by the illumination laser beam is brighter than the self-emission of the workpiece, the machining region is illuminated coaxially with the machining laser beam such that the self-emission of the workpiece generated during laser machining is suppressed or reduced. In other words, the illumination is stronger than the self-emission at the selected power of the illumination laser source and/or the selected spectral range of the illumination laser beam. In this way, the machining region, also referred to as the process zone, can be well observed. In particular, the spectral irradiance of the illumination laser beam reflected by the workpiece is greater than the spectral irradiance of the self-emission of the workpiece in the machining region when laser machining.

In addition, the power and/or the spectral range of the illumination can be adjusted or selected such that different advantageous requirements are met individually or in combination. As noted above, the illumination, detection and thermal self-emission of the workpiece can occur substantially in the visible to near-infrared electromagnetic spectral region. For example, the maximum self-emission of laser-machined metals is typically in the near-infrared region (about 760 to 2500 nm) and decreases in the visible region (about 300 to 780 nm) towards smaller wavelengths. If the spectral range of the illumination laser beam is at smaller wavelengths, for example in the blue spectral range, compared to the spectral range of the self-emission selected or adjusted, illumination can occur with a lower illumination intensity than in the longer-wavelength spectral range of the illumination laser beam. The illumination power can also be adjusted according to requirements or the task, e.g. according to the surface structure, the material and/or the shape of the workpiece, and/or according to the purpose of the illumination. Furthermore, the power of the illumination laser source can be adjusted according to the outlet opening of the machining apparatus, e.g. from the optionally irradiated nozzle of a machining head. Furthermore, adjusting the power of the illumination laser can promote safety for the operator of the machining apparatus.

In a particular embodiment, the power of the illumination laser source can be 100 mW to 3000 mW, preferably 130 mW to 1000 mW, further preferably 150 mW to 300 mW. Such powers of the illumination laser source allow suppression or reduction of the self-emission of the machining process. Furthermore, the central wavelength of the spectral range of the illumination laser beam can be in the range of 300 to 820 nm, preferably 300 to 550 nm, further preferably 300 to 490 nm. Such a spectral range of the illumination laser beam, when using typical machining lasers, can mean that less bright or intense illumination is needed compared to higher wavelengths. The spectral range of the illumination laser beam can be further selected as a wavelength band having a width of less than 10 nm, more preferably less than 5 nm. This narrow band, i.e. this narrow width of the spectral wavelength band, of the illumination laser beam assists in suppressing or reducing the self-emission of the workpiece during the machining process.

Furthermore, at least one element selected from the laser beam guiding device, the machining laser source and the illumination laser source can be configured to generate an illuminated region of the workpiece which is larger than the machining region of the workpiece, in particular at least 1.5 times as large, preferably twice as large as the machining region. This allows for extensive illumination of the machining region.

In a further embodiment of the machining apparatus, the laser beam guiding device can comprise at least one element selected from the group consisting of: at least one optical unit for focusing the machining laser beam and/or the illumination laser beam; and at least one unit for at least partially deflecting the illumination laser beam and/or the machining laser beam, in particular a dichroic mirror. If the machining laser beam and the illumination laser beam are guided coaxially by means of a transport fibre, a cost-intensively designed illumination laser source that is awkward to mount on the machining apparatus, in particular on a machining head of a machining apparatus, is not required. In addition, the machining apparatus or machining head does not become more complex or heavier because of an illumination laser source additionally mounted thereon.

As mentioned above, at least one element selected from the laser beam guiding device, the optical unit, the machining laser source and the illumination laser source are configured to generate a focus of the illumination laser beam and a focus of the machining laser beam which are axially apart from one another. This measure promotes a sufficiently large area being illuminated around the machining region, in particular the illumination region can be larger than the machining region. In addition, the machining laser source and the illumination laser source are configured to generate spectral ranges of the laser beams generated by the machining laser source and the illumination laser source; and the optical unit is dispersive. As mentioned above, the spectral range of the machining laser beam includes a first wavelength, and the spectral range of the illumination laser beam includes a second wavelength less than the first wavelength. In this case, the first wavelength can be the central wavelength of the spectral range of the machining laser beam and the second wavelength may be the central wavelength of the spectral range of the illumination laser beam. By means of these measures, individually or in combination, it may be achieved that the focus of the illumination laser does not coincide with the focus of the machining laser. Thus, it is possible for the illumination region to be larger than the machining region, in particular if the focus of the machining laser comes to rest at the machining site.

As mentioned above, the transport fibre can comprise an inner fibre core. The machining laser source and the illumination laser source are coupled to the transport fibre to guide the machining laser beam through the inner fibre core. This applies in particular to embodiments in which the machining laser beam and the illumination laser beam are guided coaxially by means of a transport fibre. The transport fibre comprises an outer fibre core enclosing the inner fibre core and/or a fibre cladding enclosing the inner or the outer fibre core. The machining laser source and the illumination laser source are coupled to the transport fibre to guide the illumination laser beam at least partially through the outer fibre core and/or through the fibre cladding. With these measures alone or in combination, the illumination region can also be made larger than the machining region. In addition, the achieved size of the illumination region in this embodiment is advantageously independent of the relative position of the focuses of the machining and illumination laser sources. Furthermore, in all embodiments in which the illumination laser beam is guided over the transport fibre, the illumination laser source is well protected against contamination in the machining laser.

In a modification of the above embodiment, the outer fibre core can have a first diameter and/or the fibre cladding can have a second diameter to generate the illuminated region of the workpiece which is larger than the machining region of the workpiece, in particular at least 1.5 time as large, preferably twice as large as the machining region.

According to a further embodiment of the machining apparatus, the laser beam guiding device can have a unit for selective beamforming of the illumination laser beam, in particular at least one diffractive optical element for selective beamforming, which is configured to generate the illuminated region of the workpiece which is larger than the machining region of the workpiece, in particular at least 1.5 times as large, preferably twice as large as the machining region. The term "unit for selective beamforming" refers in particular to one or more diffractive optical elements which act only on the machining laser wavelength or only on the illumination laser wavelength.

The machining apparatus of the embodiments can further comprise a detector device for detecting the illumination laser beam reflected from the workpiece, wherein a spectral range of the detector device is selected or can be adjusted such that it at least partially coincides with the spectral range of the illumination laser beam, in particular of the reflected illumination laser beam.

A further embodiment of the invention relates to a use of a machining apparatus according to any one of the preceding embodiments for laser machining a workpiece, in particular for laser cutting. Thus, the advantages and functions mentioned for the machining apparatus are realised during laser machining, in particular during laser cutting of workpieces.

One embodiment of the invention discloses a method for laser machining a workpiece, in particular for laser cutting, in particular using a machining apparatus according to any one of the preceding embodiments. The method includes the step of coaxially irradiating a workpiece by means of a machining laser beam from a machining laser source and an illumination laser beam from an illumination laser source; wherein a power of the illumination laser source and a spectral range of the illumination laser beam are selected such that the illumination by the illumination laser beam is brighter than a self-emission of the workpiece in a machining region during laser machining; wherein the power of the illumination laser source is selected or adjusted so as to be at least 50 mW and the spectral range of the illumination laser beam is selected or adjusted such that its central wavelength is in the range of 300 to 1000 nm; and the spectral range of the illumination laser beam is selected as a wavelength band having a width of less than 20 nm; wherein the machining laser beam and/or the illumination laser beam are focused such that a focus of the illumination laser beam and a focus of the machining laser beam are axially apart from one another; wherein the machining laser source and the illumination laser source are selected or adjusted such that the spectral ranges of the laser beams generated thereby differ; wherein the machining laser beam and the illumination laser beam are guided through a dispersive optical unit; wherein the spectral range of the machining laser beam includes a first wavelength and the spectral range of the illumination laser beam includes a second wavelength less than the first wavelength; wherein the machining laser beam and the illumination laser beam are guided coaxially through at least one transport fibre; wherein the transport fibre has an inner fibre core; wherein the machining laser beam is guided through the inner fibre core; wherein the transport fibre has an outer fibre core enclosing the inner fibre core and/or a fibre cladding enclosing the inner or the outer fibre core; and wherein the illumination laser beam is guided at least partially through the outer fibre core and/or through the fibre cladding.

In the method, the power of the illumination laser source can be selected or adjusted so as to 100 mW to 3000 mW, preferably 130 mW to 1000 mW, further preferably 150 mW to 300 mW. Furthermore, the spectral range of the illumination laser beam can be selected or adjusted such that its central wavelength is in the range of 300 to 820 nm, preferably in the range of 300 to 550 nm, further preferably in the range of 300 to 490 nm. The spectral range of the illumination laser beam can be further selected as a wavelength band having a width of less than 10 nm, more preferably less than 5 nm.

In the method of the embodiments, the machining laser beam and the illumination laser beam can be guided and/or at least one element selected from the machining laser source and the illumination laser source is selected or adjusted such that an illuminated region of the workpiece is larger than the machining region of the workpiece, in particular at least 1.5 times as large, preferably twice as large as the machining region.

The method can include at least one of the following steps: focusing at least one element selected from the machining laser beam and the illumination laser beam; and deflecting the illumination laser beam and/or the machining laser beam at least partially, in particular by means of a dichroic mirror.

As mentioned above, the spectral range of the machining laser beam includes a first wavelength, and the spectral range of the illumination laser beam includes a second wavelength less than the first wavelength. In this case, the first wavelength can be the central wavelength of the spectral range of the machining laser beam and the second wavelength can be the central wavelength of the spectral range of the illumination laser beam.

For the outer fibre core a first diameter and/or for the fibre cladding a second diameter can be selected such that the illuminated region of the workpiece is larger than the machining region of the workpiece, in particular at least 1.5 times as large, preferably twice as large as the machining region.

In the method of the embodiments, the illumination laser beam can further be selectively formed such, in particular guided such by at least one diffractive optical element, that the illuminated region of the workpiece is larger than the machining region of the workpiece, in particular at least 1.5 times as large, preferably twice as large as the machining region.

The method of the embodiments can include the step of: detecting the illumination laser beam reflected from the workpiece such that a spectral range is detected which at least partially coincides with the spectral range of the illumination laser beam, in particular the reflected illumination laser beam.

With the method for laser machining a workpiece of the above embodiments, the same advantages and functions can be realised as with the embodiments of the machining apparatus for laser machining a workpiece, in particular with identical and/or analogous features.

Further advantages, features, and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

BRIEF DESCRIPTION OF THE SEVERAL VIEWS OF THE DRAWINGS

All non-mutually exclusive features of embodiments described here can be combined with one another. The same elements of the embodiments are given the same reference signs in the following description. Individual or a plurality of elements of one embodiment can be used in the other embodiments without further mention. Embodiments of the invention are now described in more detail using the following examples with reference to figures, without intending any limitation thereby. In the figures.

DETAILED DESCRIPTION OF THE INVENTION

As used throughout the present disclosure, unless specifically stated otherwise, the term. "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, on one of B, only one of C, or any combination of and C.

The machining apparatus according to the embodiments of the invention are described below, inter alia, by way of examples with a machining head, without limiting the invention thereto. The machining apparatus and the method according to the embodiments of the invention can also be realised without a machining head.

The term. "a focus of the illumination laser beam and a focus of the machining laser beam axially apart from one another" in the embodiments means that the two focuses are axially apart from one another in the direction of irradiation towards the workpiece, i.e. are axially apart from one another along an optical axis with which the machining laser and illumination laser beams extend coaxially.

Furthermore, where value ranges are described here, the specification of a broad range with narrower alternative or preferred ranges is also considered to disclose ranges that may be formed by any combination of specified lower range limits and specified upper range limits.

Figure 1:
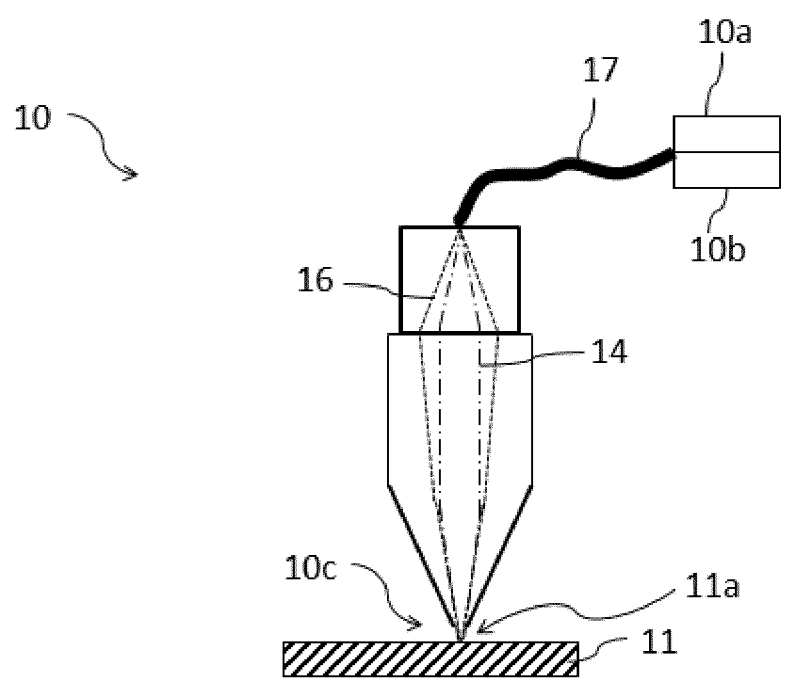
FIG. 1 schematically shows a first example of a machining apparatus for laser machining a workpiece according to the embodiments of the invention.

FIG. 1 schematically represents a first example of a machining apparatus 10 for laser machining a workpiece according to the embodiments of the invention.

The machining apparatus 10 has a machining laser source 10a for generating a machining laser beam 14. Furthermore, an illumination laser source 10b for generating an illumination laser beam 16 is provided. In addition, in the machining apparatus 10, there is an outlet opening 10c for the machining laser beam 14 and the illumination laser beam 16. Furthermore, a laser beam guiding device is provided. The laser beam guiding device is designed in such a way that the machining laser beam 14 and the illumination laser beam 16 are conducted coaxially through the outlet opening 10c. In the present example, the laser beam guiding device includes a transport fibre 17 to which the machining laser source 10a and the illumination laser source 10b are coupled. The machining laser source 10a has a power of about 6 kW and generates the machining laser beam in a spectral range which includes a wavelength of 1070 nm. The illumination laser source 10b has a power of about 300 mW and generates the illumination laser beam 16 with a central wavelength in a spectral range of 973 to 979 nm, with a wavelength band of 6 nm.

For machining a workpiece 11 made of stainless steel, the machining laser source 10a and the illumination laser source 10b are put into operation with the powers and spectral ranges described above. The machining laser and illumination laser beams 14 and 16 produced thereby are passed through the laser beam guiding device 17 and finally coaxially through the outlet opening 10c, thus being directed coaxially towards the workpiece 11. In this way, the workpiece is machined in a machining region 11a by the machining laser beam 14 so that a self-emission of the workpiece is generated. In addition, the machining region 11a is illuminated by the illumination laser beam 16, so that laser machining of the workpiece 11 can be observed.

Figure 2:
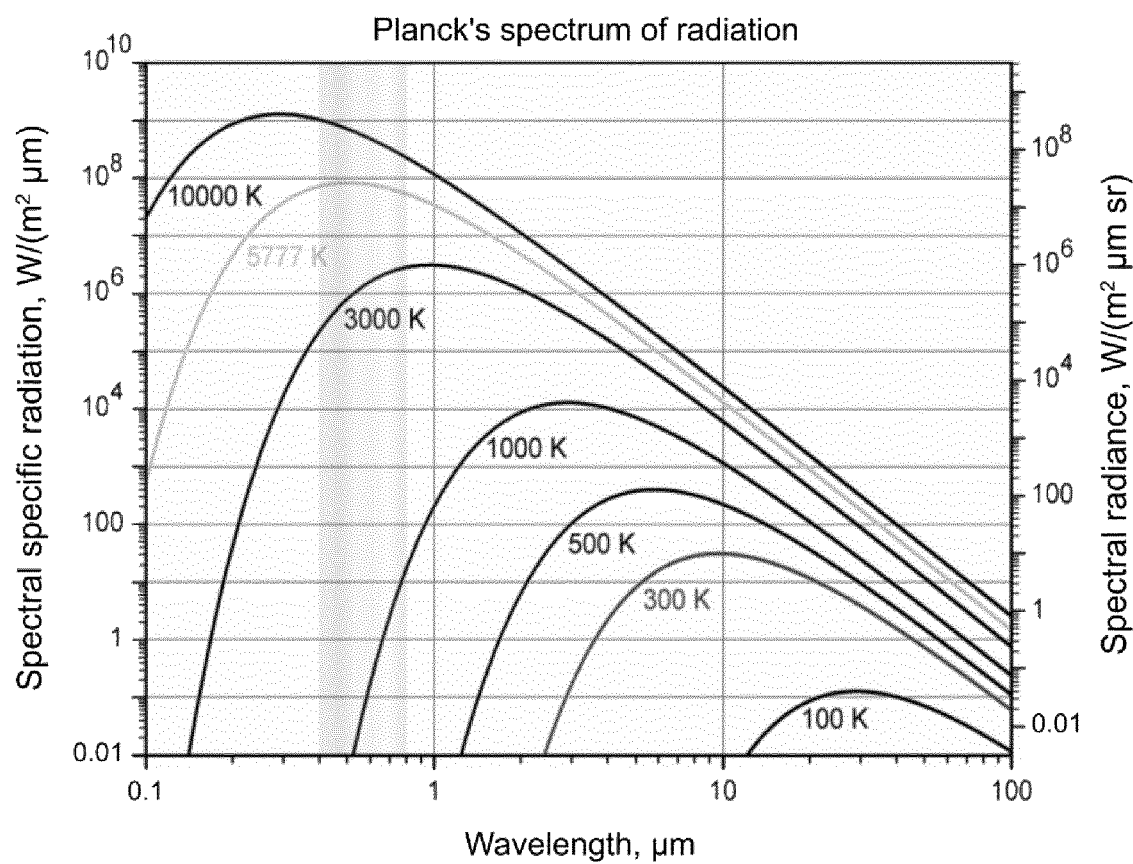
FIG. 2 shows the Planck radiation spectrum.

The self-emission in the laser machining is thermal, i.e. the self-emission of the workpiece is proportional to Planck's radiation spectrum shown in FIG. 2. The process temperature of the laser machining of stainless steel is in the range of its melting temperature. Stainless steel, as well as other metals which are processed using lasers, for example on flatbed cutting systems, typically have a melting temperature below 3000 K. This means that the maximum thermal emission of these metals in the near-infrared region is 760 to 2500 nm, including stainless steel.

The power of the illumination laser source 10b and the spectral range of the illumination laser beam 16 are selected with the above-described ranges such that the illumination by the illumination laser beam 16 is brighter than the self-emission of the workpiece in the machining region 11a during laser machining.

Compared to the wavelength of the maximum self-emission of the stainless steel in the near-infrared region, i.e. larger than 1000 nm wavelength, it can be illuminated and observed at smaller wavelengths. Therefore, a lower illumination intensity is required for the selected spectral range of the illumination laser beam 16 than for illumination in the wavelength range of the maximum stainless steel self-emission. In this way, the self-emission of the workpiece 11 is less bright compared to the illumination in the observed spectral range, so the machining region 11a can be observed with a lower self-emission of the workpiece.

Alternatively or additionally to the spectral range of the illumination laser beam 16, the illumination power is adjusted according to requirements or the task, e.g. according to the surface structure, the material and/or the shape, e.g. the thickness, of the workpiece, and/or according to the requested illumination. Furthermore, the power of the illumination laser source can be adjusted according to the outlet opening of the machining apparatus, e.g. the optionally irradiated nozzle of a machining head. Furthermore, adjusting the power of the illumination laser source can promote safety for the operator of the machining apparatus, in particular eye safety. This may be advantageous in particular when servicing the open machining apparatus or an open machining head. For example, in such a situation or in a similar situation, the illumination laser source can be reduced to less than 1 mW power with a power of at least 50 mW, for example, so that the illumination laser source is substantially safe for the eyes.

If an illumination laser source with a power of at least 50 mW is used, in addition to an adjustment of the power, similar safety precautions can be taken to protect the eyes of an operator as with the machining laser. One possibility is to integrate the illumination laser in the safety circuit of the machining laser. The safety circuit allows the illumination laser source to be turned on only when a laser release is acknowledged and/or the machine enclosure is closed. Alternatively, care can be taken, in particular during servicing of the (open) laser head/machine interior, for the illumination laser not to be switched on without eye safety precautions, such as safety glasses.

In a modification of the first example, the power of the illumination laser source 10a is about 50 mW, and the generated illumination laser beam 16 has a central wavelength in a range of about 486 to 490 nm. Even with this power of the illumination laser source and/or with this spectral range of the illumination laser beam, the self-emission of the stainless steel workpiece in said spectral range is less bright compared to the illumination, so the machining region 11a may be observed with reduced or suppressed self-emission. The spectral range of the illumination laser beam is selected as a wavelength band of 4 nm. This narrow band helps to suppress or reduce the self-emission of the workpiece during the machining process. Furthermore, less power is needed because of the shorter wavelength selected compared to the first example of illumination.

Figure 3A:
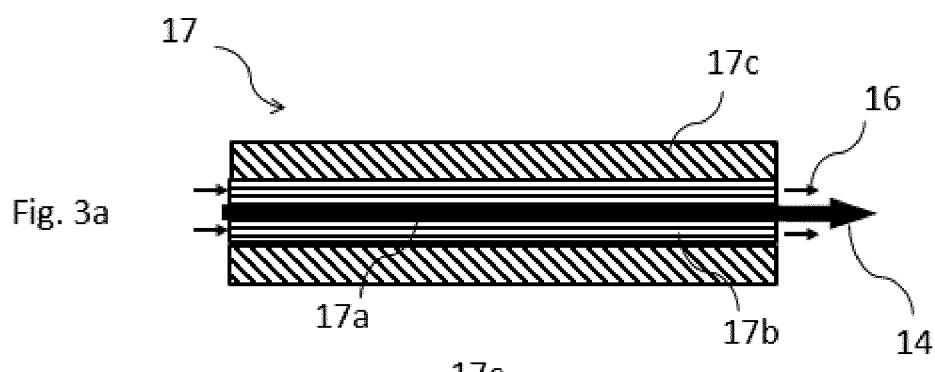
FIGS. 3a to 3c show schematic cross-sectional views and a refractive index profile of a transport fibre in a modification of the first example.

Another modification of the first example relates to the transport fibre 17. Here, the transport fibre 17 is designed so as to have an inner fibre core 17a, an outer fibre core 17b enclosing the inner fibre core 17a and a fibre cladding 17c enclosing the outer fibre core 17b. The transport fibre 17 is shown in FIG. 3a in a cross-sectional view along the transport fibre 17 and in FIG. 3b in a cross-sectional view transverse to the transport fibre 17. FIG. 3c shows the refractive index profile of the transport fibre corresponding to the cross section of FIG. 3b. The machining laser source 10a and the illumination laser source 10b are coupled to the transport fibre 17 such that the machining laser beam 14 is guided by the inner fibre core 17a and the illumination laser beam 16 is also partially guided by the outer fibre core 17b. This configuration causes the illuminated region of the workpiece to be substantially at least 1.5 times larger than the machining region 11a of the workpiece. Furthermore, the illumination laser beam 16 can additionally be guided through the fibre cladding 17c, wherein likewise the illuminated region of the workpiece is larger than the machining region. In all of these cases, the machining laser beam 14 and the illumination laser beam 16 are guided coaxially by means of the transport fibre 17.

It should be noted that some fibres are configured without an outer core and the (inner) core is directly surrounded by the cladding. In this case too, the illumination laser beam can be guided through the fibre cladding. In such an example, the fibre core can have a diameter of 100 μm, and the fibre cladding surrounding the core can have a diameter of 150 or 360 μm.

Figure 3B:
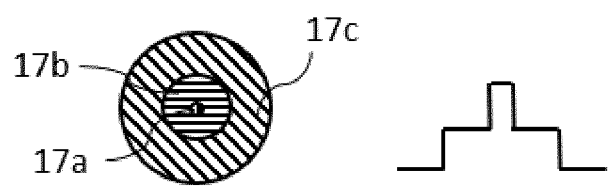
Figure 3C:

If, as in the example of FIGS. 3a to 3c, the illumination laser beam 16 is conducted via the outer fibre core 17b or additionally via the fibre cladding 17c of the transport fibre 17, then the illumination laser beam 16 is wider than the machining laser beam 14. The latter is guided only by the inner, clearly smaller fibre core 17a; see FIGS. 3a and 3b. Since the machining region 11a of the workpiece 11 is within the region of extension of the machining laser beam 16, the machining region 11a is thus smaller than the illumination region. The diameter of the outer core 17b or of the fibre cladding 17c can in principle be selected during fibre design. Depending on the desired extension of the illumination region, a correspondingly large fibre cladding or outer core diameter can be chosen. This measure, which ensures that the illuminated region around the machining region 11a is sufficiently large, is independent of the focal position of the machining and illumination laser beams 14 and 16. The size ratio of the machining region 11a and the illumination region is particularly dependent on the diameter of the outer core 17b. The design of the fibre is different and can be selected depending on the manufacturer of the fibre 17; for example, the diameter of the inner fibre core can be 100 μm, and the outer fibre core 150 or 360 μm (from the centre of the fibre).

In further modifications of the first example, the laser beam guiding device includes the transport fibre 17 or no transport fibre 17, and includes at least one element selected from the following group (not shown in FIG. 1): at least one optical unit for focusing the machining laser beam and/or the illumination laser beam, e.g. a focusing lens; and at least one unit for at least partially deflecting the illumination laser beam and/or the machining laser beam, in particular a dichroic mirror. In each case, the laser beam guiding device causes the machining laser beam and the illumination laser beam to be coaxially guided.

If, in the present example and its modifications, the machining laser beam and the illumination laser beam are guided coaxially by means of the transport fibre 17, a cost-intensively designed illumination laser source that is awkward to mount on the machining apparatus, in particular on a machining head of a machining apparatus, is not required. In addition, the machining apparatus or machining head does not become more complex or heavier because of an illumination laser source additionally mounted thereon.

Another modification of the first example comprises a video camera as a detector device (not shown in FIG. 1) for detecting the illumination laser beam reflected from the workpiece, wherein a spectral range of the detector device is selected or adjustable such that it at least partially coincides with the spectral range of the illumination laser beam, in particular the reflected illumination laser beam. In this case, an element selected from the power of the illumination laser source and the spectral range of the illumination laser beam can be selected such that the detected self-emission is smaller in the detected spectral range than the power of the illumination laser beam reflected and detected by the workpiece. The detected spectral range of the detector device can be selected as a wavelength band having a width of less than 20 nm, preferably less than 10 nm, more preferably less than 5 nm. Furthermore, the detected spectral range can be in the spectral range of the illumination laser beam or substantially detect it or substantially coincide with it. For example, a video camera can be used as a detector device which records the observation region coaxially. In this way, the machining region is monitored by video camera. Instead of a two-dimensional, spatially resolved detection unit, such as a camera, a one-dimensional detector array can also be used, its orientation being provided transversely to the cutting direction. Using the cutting direction, the spatial resolution can be found in the direction perpendicular to the array.

Figure 5:
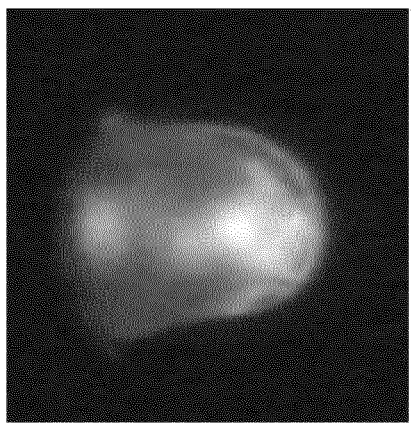
FIGS. 5 and 6 show recordings from a video camera of an unilluminated and illuminated machining region of a workpiece being machined using a machining apparatus according to the embodiments of the invention.
Figure 6:
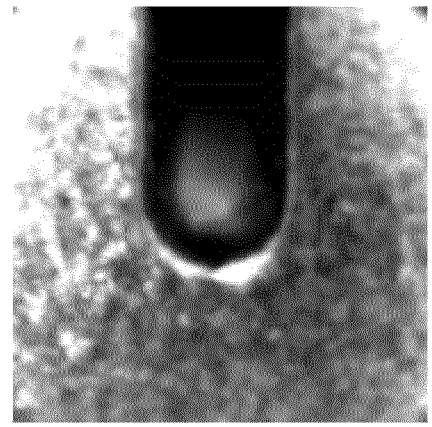

FIGS. 5 and 6 show recordings from a coaxial video camera in a laser cutting process of a stainless steel workpiece, with a machining apparatus according to the above modification of the first example. The machined workpiece is thermally emitted during the laser cutting process, i.e. broadband over a large spectral range. If detected only in a narrow spectral band, the detected power of the self-emission of the workpiece is correspondingly much lower. A laser is inherently narrowband. All the power of a laser will only be present in the narrow spectral band. If narrowband is detected, preferably exclusively in the spectral band in which the laser emits, significantly less illumination power is needed in order to provide brighter illumination compared to the brightness of the self-emission. In the present case, the visual impression is particularly important.

FIG. 5 shows a camera recording of the laser cutting process without illumination. Essentially, the self-emission of the process can be seen. In FIG. 6, the illumination laser is additionally turned on in the cutting process. For the recording from FIG. 6, a significantly shorter camera exposure time is required than without illumination. The self-emission is strongly suppressed (you can still see it weakly in the middle of the kerf gap); however, the environment of the cutting gap is clearly visible.

In a further modification, the laser beam guiding device or single or a plurality of elements thereof at least partially have an outer coating for reducing a reflection of the illumination laser beam. The coating is matched to the selected illumination and observation spectrum. This causes the largest possible part of the reflected illumination laser beam 16 to be observed and as few irritating reflections of the optical units as possible to occur. In particular, it is advantageous in this way to avoid reflections from planar optical units. In this modification, at the wavelength(s) of the illumination laser beam 16, the dichroic mirror has a reflection-to-transmission ratio of about 50%, for example. All other optical elements are substantially 100% transmissive at the illumination wavelength(s).

Figure 4:
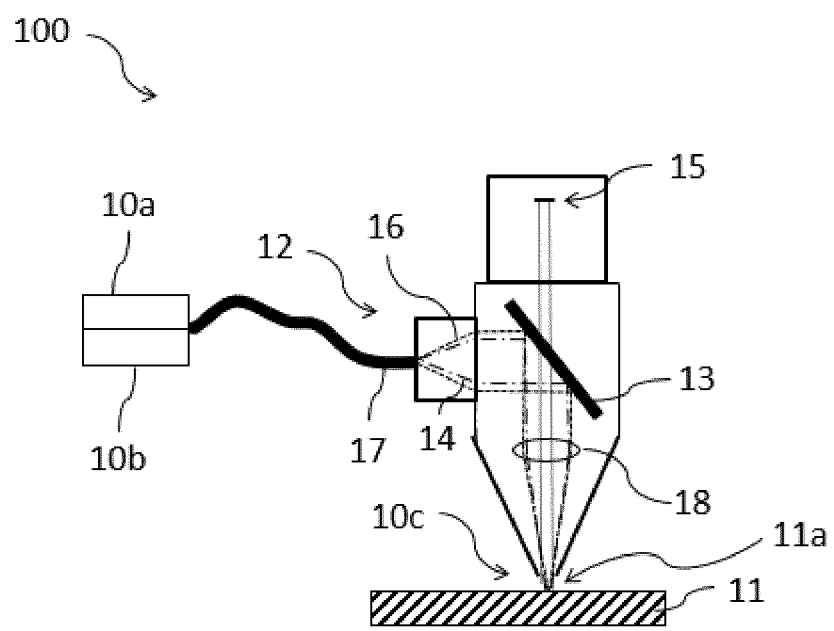
FIG. 4 schematically shows a second example of a machining apparatus for laser machining a workpiece according to the embodiments of the invention.

FIG. 4 schematically shows a second example of a machining apparatus 100 for laser machining a workpiece according to the embodiments of the invention.

In the example of FIG. 4, the transport fibre 17 is coupled laterally to a machining head 12 of the machining apparatus 100. Furthermore, a dichroic mirror 13 is provided, which reflects the machining laser beam 14 and the illumination laser beam 16 and is at least partially transparent to radiation reflected by the workpiece 11 in the wavelength range of the illumination. The dichroic mirror 13 is oriented within the machining head 12 such that the machining laser beam 14 and the illumination laser beam 16 are deflected towards the outlet opening 10c. In addition, between the dichroic mirror 13 and the outlet opening 10c is an optical unit, which is designed in the present example as a focusing lens 18. Furthermore, a detector device in the form of a video camera 15 is provided. The dichroic mirror 13 is disposed between the focusing lens 18 and the video camera 15. This makes it possible for the illumination beam 14 reflected by the workpiece to impinge on the video camera 15 at least partially through the focusing lens 18 and the dichroic mirror 13.

During operation, the machining laser beam 16 and the illumination laser beam 14 are directed laterally into the machining head 12 via the transport fibre 17, deflected at the dichroic mirror 13 towards the workpiece 11 and focused by the focusing lens 18 onto the workpiece 11. The illumination laser beam 14 is at least partially reflected back into the machining head 12 through the outlet opening 10c, is transmitted through the focusing lens 18 and the dichroic mirror 13 and impinges on the video camera 15. In this way, the machining region 11a of the workpiece 11 machined by the machining laser 14 is illuminated by the illumination laser beam 16 and observed by means of the illumination laser beam reflected at least partially on the video camera 15.

In modifications of the second example, at least one element selected from the focusing lens 18, the machining laser source 10a and the illumination laser source 10b is designed or can be adjusted such that a focus of the illumination laser beam 16 and a focus of the machining laser beam 14 are axially apart from one another, in particular on the optical axis. This design promotes illumination of a sufficiently large area around the machining region 11a. In particular, the illumination region can be larger, for example at least 1.5 times as large, preferably twice as large, as the machining region 11a, also referred to as the process interaction zone.

According to a particular modification, the machining laser source 10a and the illumination laser source 10b are designed or can be adjusted such that the spectral ranges of the laser beams generated by them differ, and the focusing lens 18 is designed to be dispersive.

In the above modification of the second example, the focus of the illumination laser beam 16 and the focus of the machining laser beam 14 do not coincide, but are apart from one another axially on the optical axis. This is achieved by the fact that the wavelengths of the machining laser beam 14 and the illumination laser beam 16 are divergent and the optical unit, in the present modification the focusing lens 18, is designed to be dispersive, i.e. has a wavelength-dependent refractive index. The latter is the case with substantially all known optical materials.

With the known lens focal length formula, there is a difference $\Delta f = f_2 - f_1$ in the focal lengths of the two wavelengths of the machining laser beam 14 and of the illumination laser beam 16.

$$\Delta f \approx \frac{r_1 r_2}{r_1 + r_2} \frac{\Delta n}{(n_1 - 1)(n_2 - 1)}$$

wherein the refractive indices of the two wavelengths are denoted by $n_1$ and $n_2$, and $\Delta n = n_2 - n_1$ is used. $\Delta f$ is advantageously large when large radii $r_1$ and $r_2$ of the imaging optical unit, here the focusing lens 18, are used and $\Delta n$ is large. With a machining laser beam 14, which also has a wavelength of 1070 nm in the present example, illumination laser beams 16 having a wavelength of less than 1070 nm, in particular wavelengths of the blue spectral range, are therefore to be preferred.

According to another modification of the second example, a further improvement in illumination is achieved by means of beamforming. In this case, the laser beam guiding device comprises a unit for selective beamforming of the illumination laser beam, for example a modified focusing lens 18, which is designed such that the illuminated region of the workpiece 11 is larger than the machining region of the workpiece 11, in particular at least 1.5 times as large, preferably twice as large as the machining region 11a. This beamforming acts only on the illumination laser beam 16 and not on the machining laser beam 14.

An example of said selective beamforming may be a diffractive optical element that only affects radiation having a wavelength in the range of the illumination laser wavelength and leaves the machining laser beam 14 unchanged. As a diffractive optical element, a diffractive optical grating can also be used on an (already existing) optical element.

Another example can be a beamforming element for optimal illumination which is implemented and/or designed such that only the illumination laser beam 16 guided over the outer core of the transport fibre 17 is affected and the machining laser beam 14 remains unchanged.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser machining systems, but also for other devices comprising lasers. Furthermore, the components of the machining apparatus for laser machining workpieces can be produced so as to be distributed over several physical products.

The invention claimed is:

1. A machining apparatus for at least one of laser machining and laser cutting a workpiece, the machining apparatus comprising:
    a machining laser source configured to generate a machining laser beam configured to perform at least one of the laser machining and the laser cutting of the workpiece;
    an illumination laser source having a power configured to generate an illumination laser beam having a spectral range;
    an outlet opening configured to guide the machining laser beam and the illumination laser beam onto the workpiece; and
    a laser beam guiding device configured to guide the machining laser beam and the illumination laser beam coaxially through the outlet opening and onto the workpiece; and
    wherein the power of the illumination laser source and the spectral range of the illumination laser beam are configured to generate an illumination on the workpiece by the illumination laser beam which is brighter than a self-emission of the workpiece in a machining region during laser machining;
    wherein the power of the illumination laser source is at least 50 mW, the central wavelength of the spectral range of the illumination laser beam is in the range of 300 to 1000 nm, and the spectral range of the illumination laser beam is a wavelength band having a width of less than 20 nm;
    wherein at least one of the laser beam guiding device, an optical unit, the machining laser source and the illumination laser source is configured to generate a focus of the illumination laser beam and a focus of the machining laser beam which are axially apart from one another;
    wherein the machining laser source and the illumination laser source are configured to generate different spectral ranges of the laser beams generated thereby;
    wherein the optical unit is dispersive;
    wherein the spectral range of the machining laser beam includes a first wavelength and the spectral range of the illumination laser beam includes a second wavelength that is less than the first wavelength;
    wherein the laser beam guiding device comprises at least one transport fibre configured to guide the machining laser beam and the illumination laser beam coaxially;
    wherein the transport fibre has an inner fibre core;
    wherein the machining laser source and the illumination laser source are coupled to the transport fibre to guide the machining laser beam through only the inner fibre core;
    wherein the transport fibre has an outer fibre core enclosing at least one of the inner fibre core and a fibre cladding enclosing the inner or outer fibre core; and
    wherein the machining laser source and the illumination laser source are coupled to the transport fibre to guide the illumination laser beam at least partially through at least one of the outer fibre core and the fibre cladding.

2. The machining apparatus according to claim 1,
    wherein the power of the illumination laser source is in the range of at least one of 100 mW to 3000 mW, 130 mW to 1000 mW and 150 mW to 300 mW; and/or
        wherein the central wavelength of the spectral range of the illumination laser beam is in the range at least one of 300 to 820 nm, 300 to 550 nm and 300 to 490 nm; and/or
        wherein the spectral range of the illumination laser beam is a wavelength band having a width of less than at least one of 10 nm and 5 nm.

3. The machining apparatus according to claim 1, wherein at least one element selected from the laser beam guiding device, the machining laser source and the illumination laser source is configured to generate an illuminated region of the workpiece which is at least one of larger, 1.5 times as large and twice as large as the machining region of the workpiece.

4. The machining apparatus according to claim 1, wherein the laser beam guiding device comprises at least one element selected from the group consisting of:
    at least one additional one optical unit for focusing at least one of the machining laser beam and the illumination laser beam; and
    at least one of another optical unit and a dichroic mirror for at least partially deflecting at least one of the illumination laser beam the machining laser beam.

5. The machining apparatus according to claim 1,
    wherein the outer fibre core has a first diameter and/or the fibre cladding has a second diameter to generate the illuminated region of the workpiece which is at least one of larger,
    1.5 times as large and twice as large as the machining region of the workpiece.

6. The machining apparatus according to claim 1, wherein the laser beam guiding device has at least one of
an optical unit and
at least one diffractive optical element for selective beam-forming of the illumination laser beam which is configured to generate an illuminated region of the workpiece which is at least one of larger, 1.5 times as large or twice as large as the machining region of the workpiece.

7. The machining apparatus according to claim 1, further comprising a detector device for detecting the illumination laser beam reflected from the workpiece, wherein a spectral range of the detector device is selected or adjustable such that it at least partially coincides with at least one of the spectral range of the illumination laser beam and the reflected illumination laser beam.

* * * * *